(12) United States Patent
Sorg

(10) Patent No.: US 6,559,418 B1
(45) Date of Patent: May 6, 2003

(54) METHOD OF CONTROLLING CASTER AND CAMBER BY WELDING

(75) Inventor: Timothy Sorg, Churubusco, IN (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 09/852,721

(22) Filed: May 11, 2001

(51) Int. Cl.[7] ............... B23K 9/00; G01B 5/255
(52) U.S. Cl. ............ 219/149; 219/137 R; 280/86.751
(58) Field of Search ............... 228/102, 103, 228/234.1; 219/149, 50, 137 PS, 137 R; 280/86.751, 124.151, 124.153, 124.157, 124.179; 301/111.01, 111.03, 111.04, 111.05, 111.06, 126, 131, 132, 137

(56) References Cited

U.S. PATENT DOCUMENTS 5,729,345 A  * 3/1998 Ludewig et al. ............ 356/394
5,901,426 A  5/1999 Okazaki .................. 29/407.08
6,032,967 A  * 3/2000 Ogoniek .............. 280/124.175

FOREIGN PATENT DOCUMENTS

JP    62-56802    * 3/1987 ........... G01B/5/255

* cited by examiner

Primary Examiner—M. Alexandra Elve
Assistant Examiner—Kevin P. Kerns
(74) Attorney, Agent, or Firm—Liniak, Berenato & White

(57) ABSTRACT

A method of controlling caster and/or camber angle by controlling the amount of heat input during the welding process associated with the axle tube brackets and other suspension components such as the lower control arm, spring seat, shock bracket and sway arm bracket. In other words, larger hot weld spots versus smaller cooler welds will distort the axle tube differently. If the design of a tube assembly has undesirable caster and/or camber angles due to distortions caused by the welding of suspension components, the weld can be tuned to distort the assembly to a desired caster and/or camber angle. For example, if the camber desired requires the axle tube to be deflected up, the travel speed of welds on the top side of the tube may be slowed thus increasing the heat input.

11 Claims, 3 Drawing Sheets

METHOD OF CONTROLLING CASTER AND CAMBER BY WELDING

BACKGROUND OF THE INVENTION

1. Field of the Invention

This invention relates to a method for controlling caster and camber of wheel suspensions for vehicles and relates more particularly to a method of controlling caster/camber using welding techniques.

2. Description of Related Art

In suspension systems of a motor vehicle, it is important to provide a predetermined desired wheel alignment, and in connection with the steering wheels it is particularly desirable to maintain accuracy in the mounting of such wheels to provide the desired degree of camber and caster. Failure to maintain the aforesaid characteristics may, and often does, result in excessive tire wear, difficult steering, shimmy or tramp of the steering wheel, and other undesirable effects.

In actual production, difficulty has been experienced in maintaining the aforesaid characteristics in keeping with practical limitations, cost, workmanship, manufacturing tolerances, and the like.

Typically, an adjustment mechanism is provided at the wheel end to adjust caster and camber; e.g., between the kingpin and the chassis or axle.

SUMMARY OF THE INVENTION

It is an object of my invention to overcome the aforesaid undesirable effects and difficulties in an improved manner.

A further object of my invention resides in the provision of an improved wheel suspension particularly adapted for manufacture at relatively low cost.

A still further object of my invention resides in the provision of an improved wheel suspension capable of manufacture in keeping with ordinary practical limitations of manufacturing tolerances.

A further object is to provide improved means for adjusting a vehicle steering wheel for caster or camber or both by the provision of an adjusting method associated with the welding process for the axle tube and its associated suspension components.

According the preferred method of the invention, caster and/or camber angle can be controlled by inducing deflection during the welding process by controlling the amount of heat input during and after the welding process associated with the axle tube brackets and other suspension components such as the lower control arm, spring seat, shock bracket and sway arm bracket. In other words, larger hot weld spots versus smaller cooler welds will distort the axle tube differently. If the design of a tube assembly has undesirable caster and/or camber angles due to distortions caused by the welding of suspension components, the weld can be tuned to distort the assembly to a desired caster and/or camber angle. For example, if the camber desired requires the axle tube to be deflected up, the travel speed of welds on the top side of the tube may be slowed thus increasing the heat input. Other deflections follow the same technique of heat input to create a desired deflection.

The method and concepts of this invention is equally applicable to front and rear axle assemblies where caster and camber angles are a concern.

These and other benefits of the present invention will become apparent with reference to the following drawings and description.

DETAILED DESCRIPTION OF PREFERRED EMBODIMENTS

Figure 1:
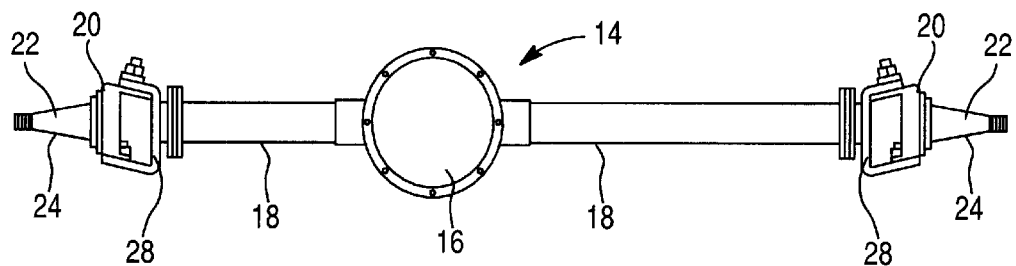
FIG. 1 is a schematic elevational view of a wheel and axle drive assembly.

Referring to the drawings and in particular FIG. 1, an axle tube for a four-wheel drive vehicle having a main differential and wheel drive assembly 14 is shown. The main wheel drive and differential assembly 14 includes a central differential housing 16 which is normally driven through a conventional power drive train from an internal combustion engine. Extended from the differential housing 16 on opposite sides thereof is connected a drive axle assembly 18 having wheel assemblies 20 mounted on each respective outer end thereof.

Each drive wheel assembly 20 is provided with a wheel spindle 22 connected to a wheel drive shaft 24 and, normally, a brake assembly is mounted therein but is not shown in the drawings as it does not form part of the invention. Each joint assembly 20 includes a knuckle member 28, which is operable to hold the respective housing of the drive wheel assemblies 20.

Figure 2:
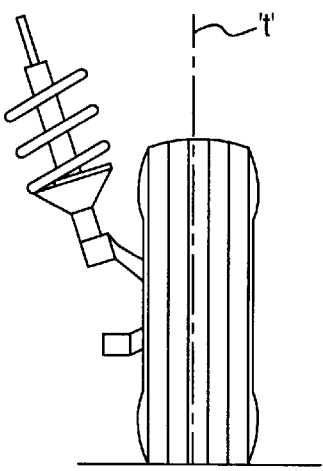
FIG. 2 is a schematic view shown a wheel end as viewed from the front to illustrate camber.

Camber is the inward or outward tilt of the wheels from true vertical as viewed from the front or rear of the vehicle as shown with reference to FIG. 2. Camber is zero degrees if the tilt 't' of the wheels is truly vertical as shown in FIG. 2. Camber is positive if the top of the tire is tilted out, and camber is negative if the top of the wheel is tilted in. Camber can cause tire wear, create wear on bearings, and cause pull on the steering (i.e., the vehicle will pull toward the side with the most camber if it is not correct.

Figure 3:
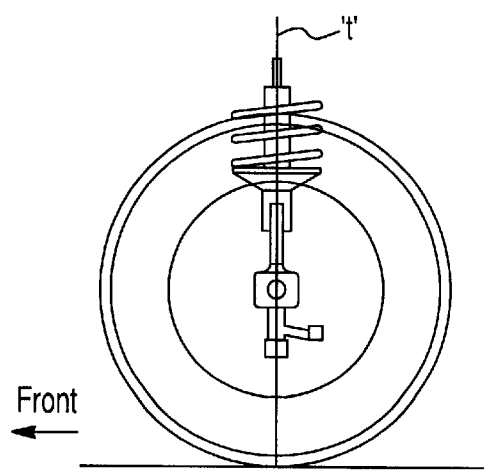
FIG. 3 is a schematic view of a wheel end as viewed from the side to illustrate caster.

Caster is the forward and rearward tilt of the steering axis in reference to a vertical line as viewed from the side of the vehicle. The steering axis is defined as the line drawn through the upper and lower steering pivot points. Zero caster means that the steering axis is straight up and down, also called zero degrees, as shown in FIG. 3. Positive caster is present when the upper suspension pivot point is behind the lower pivot point as viewed from the side. Negative caster is present when the upper suspension pivot point is ahead of the lower pivot point as viewed from the side. Caster does not directly cause tire wear but it may reduce steering stability.

Figure 4:
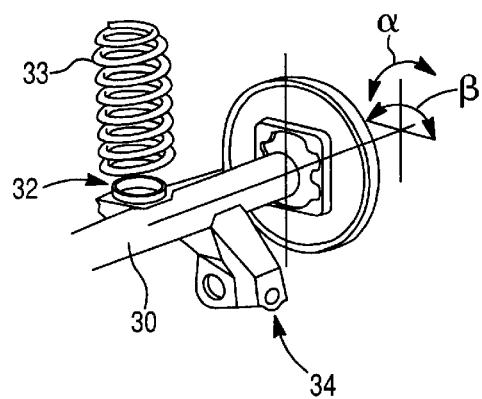
FIG. 4 is a perspective schematic view of a wheel end showing a coil suspension spring and seat as well as a shock absorber and mounting bracket.

FIG. 4 is a schematic view of a wheel end and axle tube whereby the axle tube 30 is provided with a coil spring seat 32 for mounting the coil spring 33 and a shock absorber bracket 34. The spring 32 and shock bracket 34 are welded to the axle tube 30. According to the method of this invention, the welding process is used to control the camber angle (see angle α in FIG. 4) and/or the caster angle (see angle β in FIG. 4) for the wheel end assembly. Depending on the amount of heat applied to the axle tube during the welding process, the axle tube will deflect. The amount of heat associated with the welding process for the axle tube components is dependent on the voltage, amperage, and travel speed of the heat applicator. The effect of heat on the welds will distort the tube differently. If the design of a tube assembly has undesirable caster and/or camber angles, the welds can be tuned to distort the axle assembly to a desired caster/camber. The exact amount of distortion is a function of heat input and the density/composition of the materials, and other factors known to those of skill in the art.

For the axle assembly of FIG. 4, the welding process may be used to cause distortion of the axle tube in a manner to deflect the axle tube 30 in at least one of the camber angle (α) or the caster angle (β) based on the heat input during the welding process during and/or after the welding process to affixed the spring seat 32 and the shock bracket 34.

Figure 5:
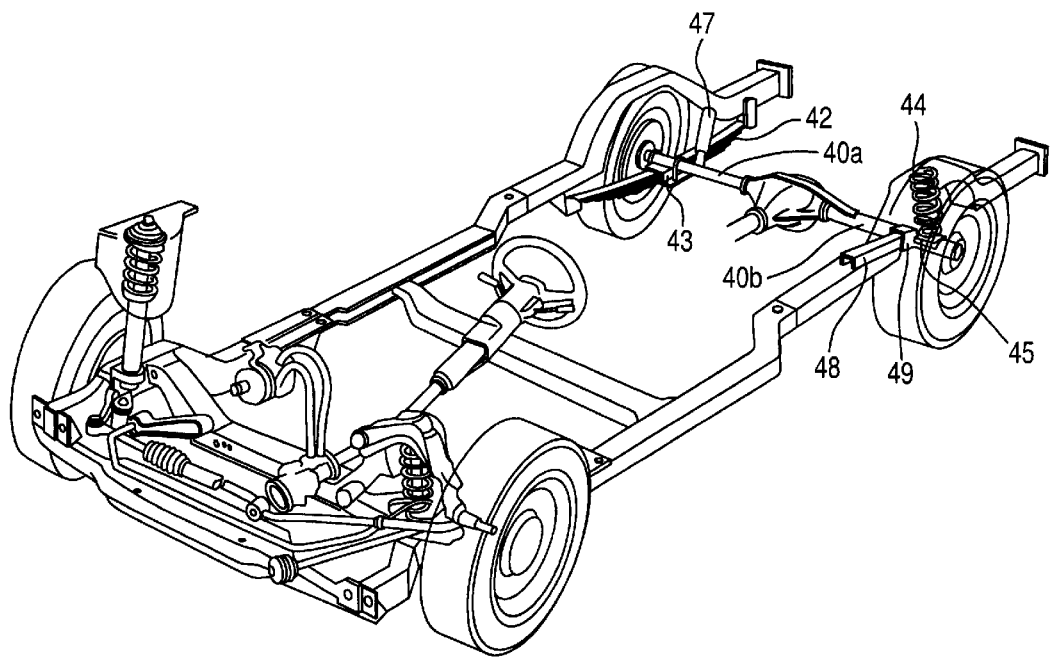
FIG. 5 is a perspective schematic view of a wheel end having an alternate suspension arrangement.

FIG. 5 is a schematic view of the suspension system of an automobile whereby the rear suspension is shown to utilize leaf springs 42 along one axle tube 40a and coil spring 44 along the opposite axle tube 40b. The leaf spring 42 engages the axle tube 40a at spring bracket 43 and the coil spring 44 engages the axle tube 40b at the spring seat 45. In each instance the spring brackets 43 and spring seat 45 are welded to the axle tubes 40a, 40b, and the welding process may be utilized to affect camber and caster angles in the manner described above. Likewise, the shock absorber 47 is welded to the axle tube 40a via a shock bracket in the manner shown in FIG. 4, and the sway bar 48 is mounted to the axle tube 40b through a sway bar bracket 49.

Figure 6:
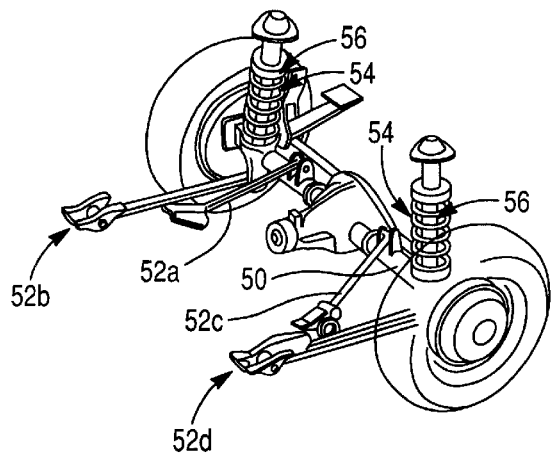
FIG. 6 is a perspective schematic view of a wheel end showing another suspension arrangement.

Another axle tube assembly is shown in FIG. 6 in which the axle tube is provided with a number of welded brackets associated with the suspension system. In the assembly of FIG. 6, the suspension system comprises a number of control arms 52a, 52b, 52c, 52d, as well as coil springs 54 and shock absorbers 56. Each of these components requires an associated mounting bracket welded to the axle tube 50. As with the foregoing examples, these welded components provide an opportunity to adjust camber and caster angles while or after these components are being welded in place onto the axle tube 50.

Figure 7:
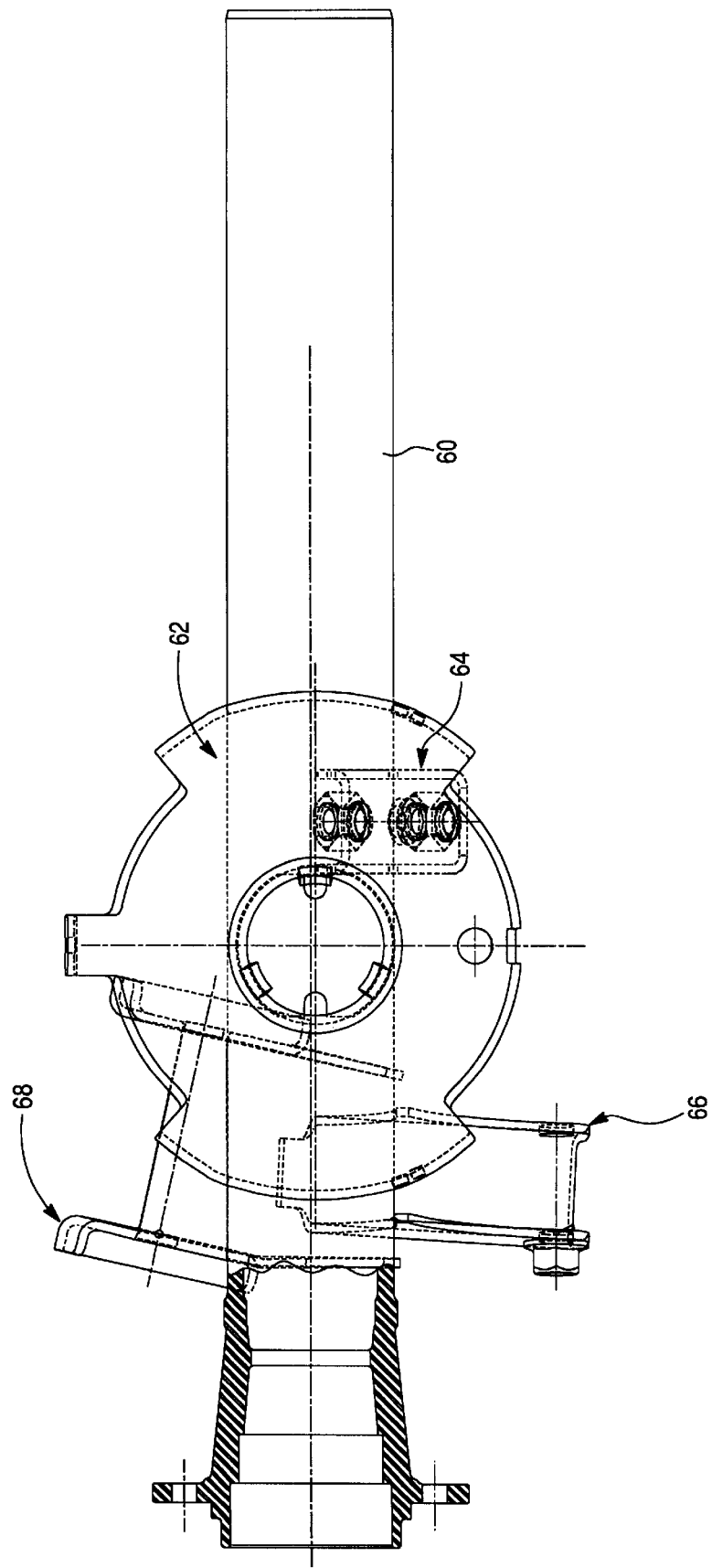
FIG. 7 is a top view of a further axle tube design upon which the inventor has performed actual tests to adjust the camber and caster angles.

FIG. 7 is a top view of a further axle tube design upon which the inventor has performed actual tests to adjust the camber and caster angles. The axle tube 60 of FIG. 7 is provided with a coil spring seat 62, a sway bar bracket 64, a shock absorber bracket 66, and a lower control arm bracket 68. Based on experimentation by the inventor, studies showed that deflections of +/−1.5 mm were obtained on the part shown in FIG. 7 based on the method set forth in this invention, whereby the amount of heat input to different sections of the axle tube during the welding process associated with various bracket member caused controlled deflection of the axle tube assembly. The controlled deflection and distortion associated with the heat generation during the welding process is used by the present inventor to tune the welding process to achieve a desired caster and camber.

According the above described method, caster and/or camber angles can be controlled by controlling the amount of heat input during the welding process associated with the axle tube brackets and other suspension components such as the lower control arm, spring seat, shock bracket and sway arm bracket. In other words, larger hot weld spots versus smaller cooler welds will distort the axle tube differently. If the design of a tube assembly has undesirable caster and/or camber angles due to distortions caused by the welding of suspension components, the welding process and associated welds can be tuned to distort the assembly to a desired caster and/or camber angle. For example, if the camber desired requires the axle tube to be deflected up, the travel speed of welds on the top side of the tube may be slowed thus increasing the heat input. Other deflections follow the same technique of heat input to create a desired deflection.

While this invention has been shown and described with regard to several axle tube assemblies and preferred steps, it will be understood that various changes in process and detail may be made thereto without departing from the spirit and scope of this invention.

What is claimed is:

1. A method of adjusting at least one of camber angle and caster angle in a wheel assembly of a vehicle, comprising the steps of:

providing an axle tube having a longitudinal axis and a circumference;

providing at least one component to be welded to said axle tube;

welding said at least one component onto said axle tube;

controlling an amount of heat input to said axle tube to cause a deflection of said axle tube to thereby adjust at least one of camber angle and caster angle to a desired angle.

2. The method according to claim 1, wherein said step of controlling said amount of heat occurs during said step of welding.

3. The method according to claim 1, further comprising a step of measuring at least one of camber angle and caster angle of said wheel assembly prior to said step of controlling.

4. The method according to claim 1, wherein said step of controlling said amount of heat includes a step of increasing a voltage associated with a welding process.

5. The method according to claim 1, wherein said step of controlling said amount of heat includes a step of increasing an amperage associated with a welding process.

6. The method according to claim 1, wherein said step of controlling said amount of heat includes a step of increasing a duration of heating applied to an area during a welding process.

7. The method according to claim 1, wherein said at least one component is a coil spring seat.

8. The method according to claim 1, wherein said at least one component is a shock absorber bracket.

9. The method according to claim 1, wherein said at least one component is a control arm bracket.

10. The method according to claim 1, wherein said deflection occurs along an axis that is parallel to said longitudinal axis.

11. The method according to claim 1, wherein said deflection occurs along said circumference.

* * * * *